United States Patent

Brand et al.

[11] Patent Number: 6,097,033
[45] Date of Patent: Aug. 1, 2000

[54] DOSIMETER PROBE

[75] Inventors: Hans-Norbert Brand, Munich; Günter Krehbiel, Rosenheim, both of Germany

[73] Assignee: GSF-Forschungszentrum für Umwelt und Gesundheit GmbH, Oberscheissheim, Germany

[21] Appl. No.: 09/236,450

[22] Filed: Jan. 25, 1999

Related U.S. Application Data

[63] Continuation-in-part of application No. PCT/EP97/05282, Sep. 26, 1997.

[30] Foreign Application Priority Data

Oct. 21, 1996 [DE] Germany .................. 196 43 317

[51] Int. Cl.[7] ............................................. G01T 1/11
[52] U.S. Cl. ............................ 250/484.3; 250/337
[58] Field of Search ..................... 250/484.1, 484.2, 250/484.3, 484.5, 337, 372

[56] References Cited

U.S. PATENT DOCUMENTS

| | | | |
|---|---|---|---|
| 3,983,717 | 10/1976 | Collica et al. | 250/484.3 |
| 4,506,157 | 3/1985 | Keller | 250/337 |
| 4,698,505 | 10/1987 | Brand | 250/337 |
| 5,179,281 | 1/1993 | Tawil et al. | 250/337 |

*Primary Examiner*—F. L. Evans
*Attorney, Agent, or Firm*—Klaus J. Bach

[57] ABSTRACT

In a dosimeter probe comprising a housing having two straps and including a cylindrical recess with a central extension a disc-like enclosure with an annular projection forming a circular cavity is disposed and a thermoluminescence detector is received in the cavity. At the open end of the cylindrical recess, the housing has an inwardly projecting annular flange structure which retains the enclosure in the recess and the enclosure is chamfered at the circumference of its disc portion for centering the enclosure with respect to the housing and facilitating insertion into the housing with a fit which provides for light-tight engagement between the enclosure and the housing walls.

5 Claims, 3 Drawing Sheets

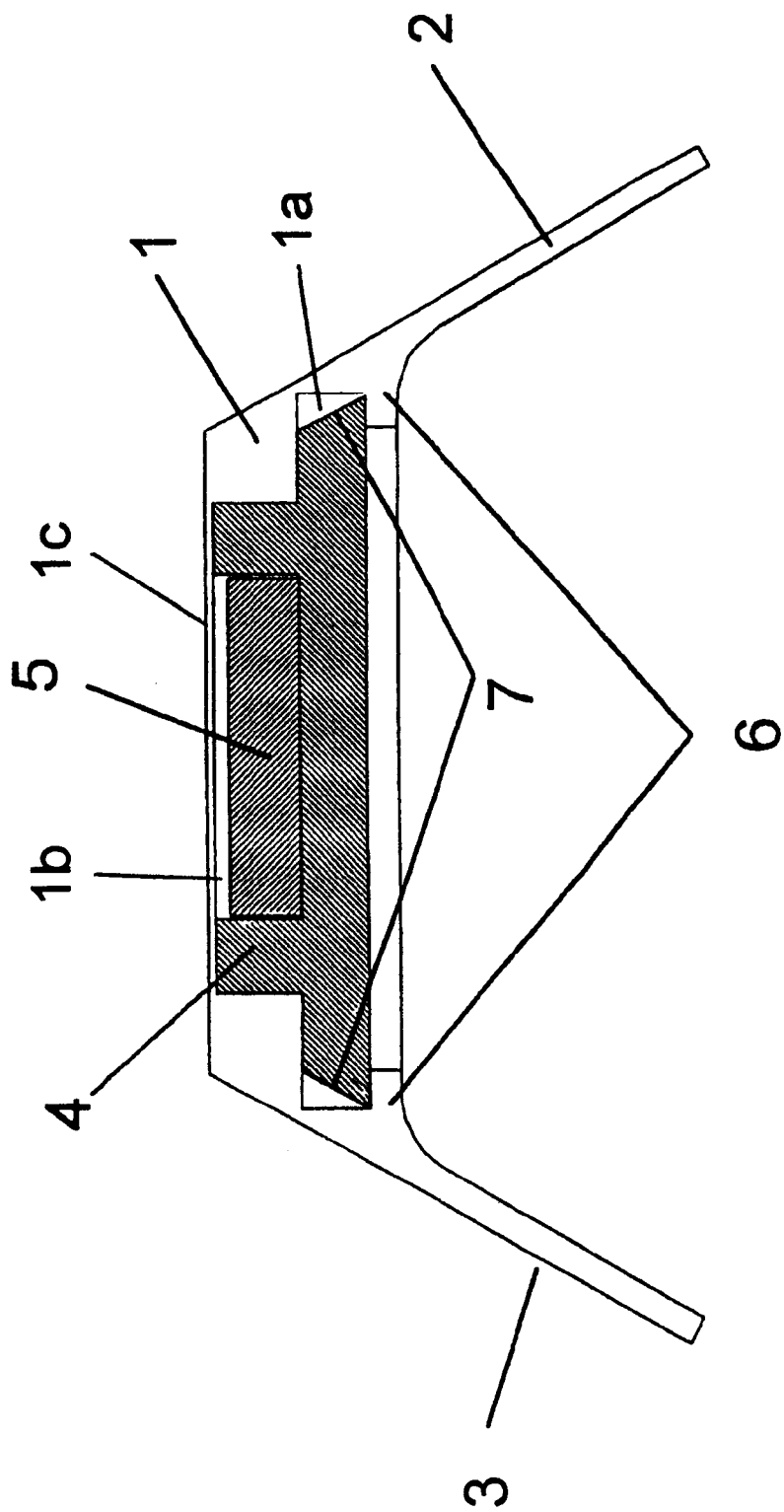

DOSIMETER PROBE

This is a continuation-in-part application of pending international patent application PCT/EP97/05282 filed Sep. 26, 1997 and claiming the priority of German application 196 43 317.7 filed Oct. 21, 1996.

BACKGROUND OF THE INVENTION

The invention relates to a dosimeter probe comprising a housing with two legs or straps arranged on the housing and a thermoluminescence detector accommodated in a recess in the housing closed by a polymer material enclosure which is fitted into the recess such that no light can reach the thermoluminescent detector within the enclosure.

In the medical field (nuclear medicine, x-ray diagnostics, interventional and surgical radiology) particle dosimeters are only insufficiently used because dosimeters are only insufficiently used because the thermoluminescent (TL) dosimeter probes available do not fulfill all of the requirements of the users. Particularly in the medical field the heads and extremities of the people handling the equipment can be subjected to substantial radiation exposure and radiation exposure in excess of the legal dose limits may not be recognized. These uses need small-size measuring probes which, even when worn under a surgeons glove, do not detrimentally affect finger mobility and which can be disinfected or sterilized. At the same time, the requirements of the German Regulations for Gauging Weights and Measures must be fulfilled and an evaluation of the measuring results must be possible in a simple manner by commercially available apparatus. Presently, there is only a limited number of types of TL particle dosimeters commercially available and they fulfill only some of the requirements. available and they fulfill only some of the requirements.

Fingerring dosimeters with encapsulated probes are also known from U.S. Pat. No. 4,506,157 and U.S. Pat. No. 4,698,505.

It is the object of the present invention to provide a dosimeter probe of the type referred to above wherein the detector is encapsulated in such a way that no light can reach the detector.

SUMMARY OF THE INVENTION

In a dosimeter probe comprising a housing having two straps and including a cylindrical recess with a central extension a disc-like enclosure with an annular projection forming a circular cavity is disposed and a thermoluminescence detector is contained in the cavity. At the open end of the cylindrical recess, the housing has an inwardly projecting annular flange structure, which retains the enclosure in the recess and the enclosure is chamfered at the circumference of its disc portion for centering the enclosure with respect to the housing and facilitating insertion into the housing with a snug fit which provides for a light-tight engagement between the enclosure and the housing walls.

The dosimeter probe according to the invention essentially fulfills the requirements mentioned above. As detector material LiF:Mg, Ti(TLD-100) is employed which is tightly pressed into the dosimeter housing. The dosimeter housing consists of a skin compatible plastic material (polyamide) and carries a wear resistant machine readable identification number. The dosimeter probe is watertight, it can be disinfected, it can be cold-sterilized, and it is mechanically stable. The probe has the form for example of an open fingering with an infinitely adjustable self-locking closure mechanism, but it may also be attached to other body members (forehead, arm etc.) by means of additional straps. In comparison with conventional systems, the dosimeter probe is small lightweight and steplessly adjustable to any finger size. The dosimeter probe is also quite slim so that its use in the interventional and surgical radiology is facilitated as it can be worn under a surgical glove without impeding finger movement.

The dosimeter probe is suitable for use in the photonequivalent-dosis measuring range $1 \text{ mSv} < Hx < 10 \text{ Sv}$ in the energy range $15 \text{ keV} < E < 1.3 \text{ MeV}$ with radiation incident angles of 45° and it fulfills the requirements for particle dosimeters according to DIN 6816, PTB-A 23.2.1 and paragraph 2 section 3 sentence 4 of the regulations for gauging weights and measure.

The invention will be described below on the basis of a particular embodiment with reference to the accompanying drawings.

BRIEF DESCRIPTION OF THE DRAWINGS

FIG. 3 is a cross-sectional view of the dosimeter probe.

DESCRIPTION OF A PARTICULAR EMBODIMENT

Figure 1:
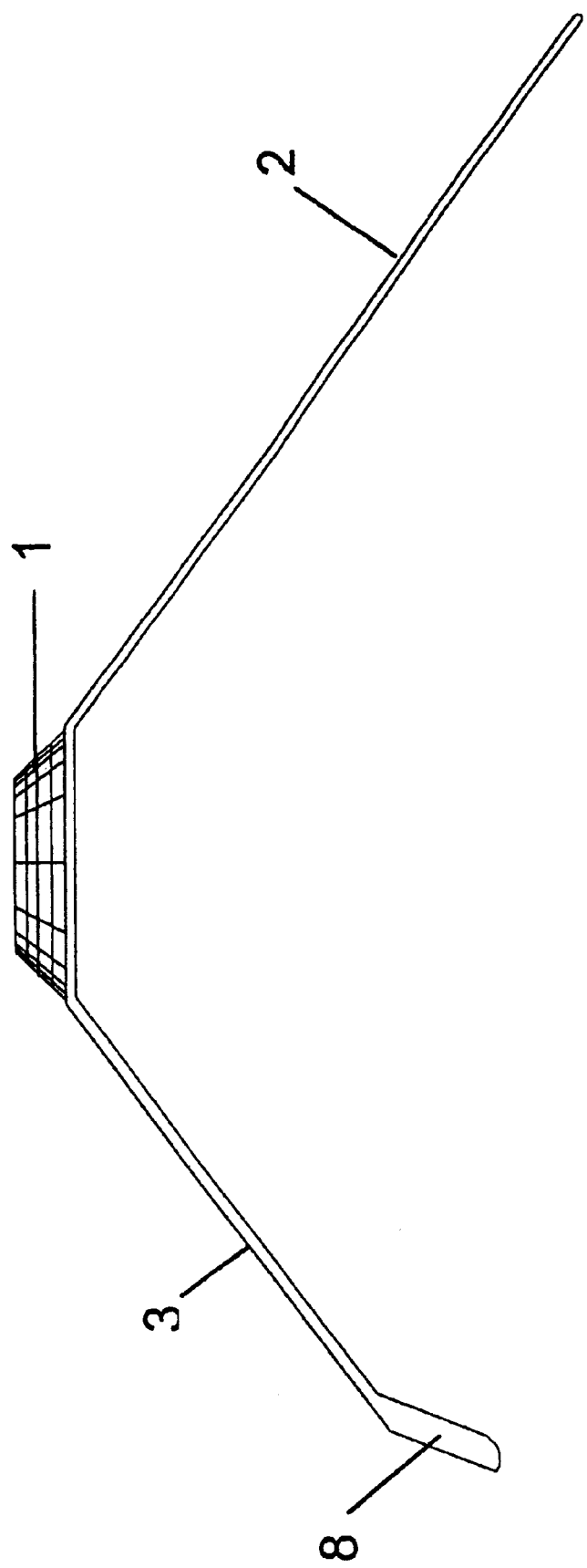
FIG. 1 is a side view of the dosimeter probe arrangement.

FIG. 1 is a side view of the housing 1 of the dosimeter probe which includes straps 2, 3 and consists of polyamide material. The saw-tooth-like corrugations on the top and bottom sides of the strap 2 (FIG. 2) and on the bottom side of the strap 3 are not shown in FIG. 1. At its free end, the strap 3 includes an ear portion 8 for interconnecting the two straps 2, 3. The ear portion 8 is provided with saw-tooth-like corrugations 8a and a catch which is not shown in the drawings. When the straps 2, 3 are joined, the corrugations at the bottom side of the strap 3 and the corrugations at the top side of the strap 2 are disposed in engagement with each other. Specifically, for engaging the two straps 2, 3, the free end of strap 2 is inserted through the opening 10 at the end of strap 3 to form the desired loop and the corrugations at the bottom side of the strap 3 then engage the corrugations 8a at the ear portion 8 while the tab 8b holds the strap 2 in engagement with the strap 3.

Figure 2:
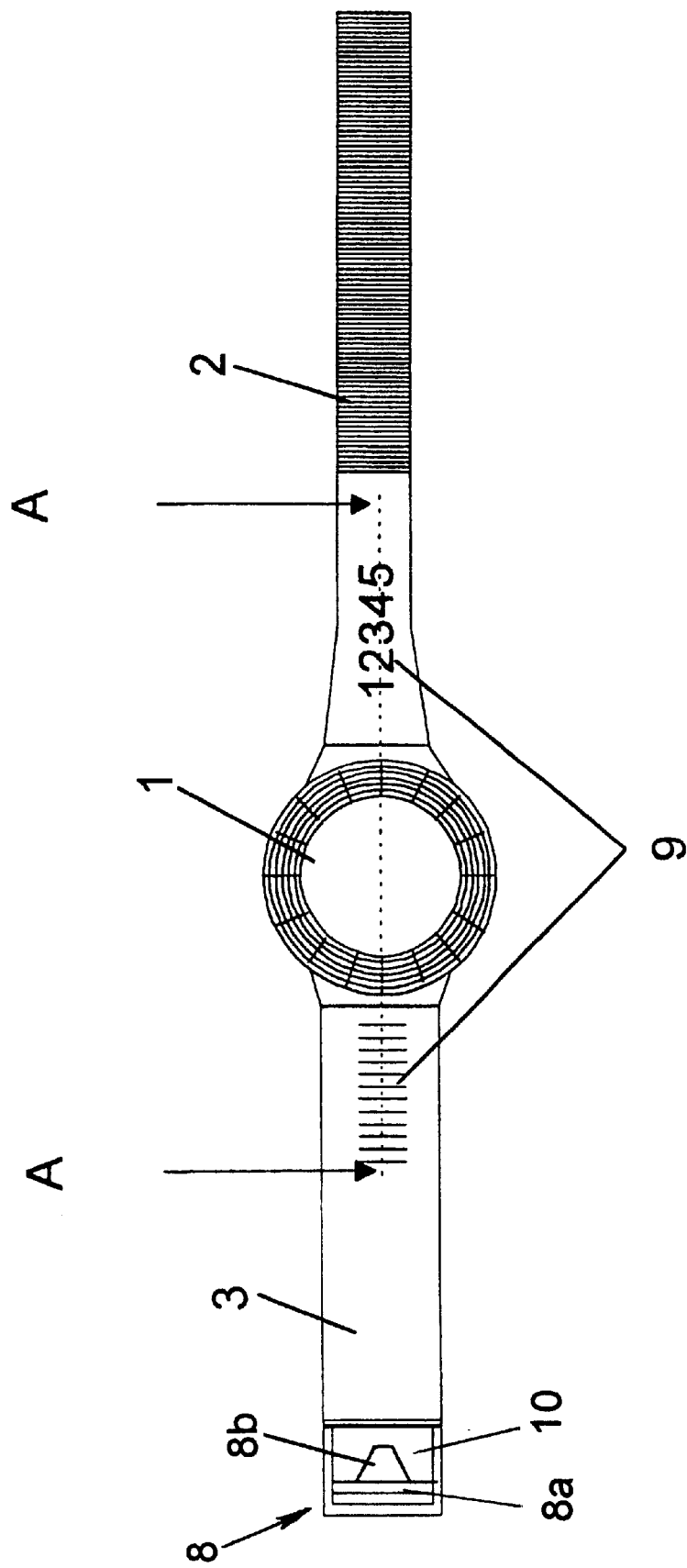
FIG. 2 is a top view of the dosimeter probe arrangement.

FIG. 2 is a top view of the dosimeter probe. It shows identification codes 9, which are applied to the straps 2, 3 in such a way that they are wear resistant. The ear portion 8 at the end of the strap 3 shows the corrugations 8a and the locking tab 8b. The saw-tooth-like corrugations of strap 2 are indicated.

FIG. 3 is a cross-sectional view of the center portion of the dosimeter probe.

The enclosure 4 in which the detector 5 is contained is pressed into the housing 1 with the straps 2, 3 such that it is engaged in a form-locking manner and sealed therein. The recess 1a in the housing is cylindrical and has a central extension 1b. The end wall 1c of the recess extension should not be thicker than 0.3 mm to permit passage of low energy radiation. The bottom opening of the cylindrical recess is restricted by an annular flange structure 6 of rectangular profile. This annular flange structure 6 firmly retains the enclosure 4 within the recess. The enclosure 4 is a circular disc with an annular projection forming a cavity for receiving the thermoluminescence detector 5. The upwardly directed surface of the annular disc and the front surface and the outer wall of the annular flange structure form a good seal in cooperation with the respective inner housing surface areas. The circular disc of the enclosure 4 is provided at its top side with a chamfer 7 which facilitates centering and inserting the enclosure into the housing 1.

A particularly suitable material for the housing 1 with the straps 2, 3 and also for the enclosure 4 is polyamide, but other hydrophobic materials such as Teflon may be used.

What is claimed is:

1. A dosimeter probe comprising a housing having two straps extending therefrom and including a cylindrical recess with a central extension of reduced diameter and an open end opposite said central extension, an enclosure disposed in said cylindrical recess and having an annular projection forming a circular cavity, a thermoluminescence detector contained in said circular cavity, said housing having an annular flange structure projecting inwardly at the open end of said cylindrical recess for restricting said opening and firmly retain said enclosure in said recess, said enclosure being provided at its circumferences with a chamfer for centering said enclosure with respect to said housing and facilitating insertion of said enclosure into said recess, said annular flange structure having a rectangular profile, and said enclosure snugly engaging the adjacent housing walls for light-tight engagement therewith.

2. A dosimeter probe according to claim 1, wherein one of said straps includes at its free end an ear portion with an opening and saw-tooth corrugations and a locking tab projecting into said opening and the other of said straps having corrugations engaging the saw-tooth corrugations on said one strap when said straps are joined and said locking tab holds said straps in engagement with each other.

3. A dosimeter probe according to claim 1, wherein said central extension of said cylindrical recess is delimited by an housing end wall having a thickness of not more than 0.3 mm.

4. A dosimeter probe according to claim 1, wherein said housing with said straps and said enclosure consist of a polyamide material.

5. A dosimeter probe according to claim 1, wherein wear resistant identification codes are disposed on said straps.

* * * * *